United States Patent
Stewart

[15] 3,650,431
[45] Mar. 21, 1972

[54] SAFETY CONTAINER
[72] Inventor: Dan F. Stewart, Memphis, Tenn.
[73] Assignee: Phillips Petroleum Company
[22] Filed: Dec. 19, 1969
[21] Appl. No.: 886,663

[52] U.S. Cl..........................................220/88 R, 220/63 A
[51] Int. Cl....................................................B65d 25/14
[58] Field of Search..............206/6, 46 FC; 220/88 R, 88 A, 220/63 A, 88; 137/57 C; 161/168, 169, 170; 55/103; 210/131, 24; 252/62

[56] References Cited

UNITED STATES PATENTS

| | | | |
|---|---|---|---|
| 2,783,609 | 3/1957 | Breen | 57/140 |
| 3,204,319 | 9/1965 | Baer et al. | 28/1.8 |
| 3,373,470 | 3/1968 | Joly | 28/72.14 |
| 2,525,497 | 10/1950 | Monfried | 206/46 M |
| 3,441,950 | 4/1969 | Miller | 220/85 X |
| 3,251,728 | 5/1966 | Humbert et al. | 206/46 FC |
| 2,612,966 | 10/1952 | Nicol | 55/103 |
| 2,795,290 | 6/1957 | Butsch et al. | 55/103 |
| 3,059,251 | 10/1962 | Pollock | 161/175 X |
| 1,080,263 | 12/1913 | Coleman | 220/88 R |
| 2,305,923 | 12/1942 | Held | 220/88 R |
| 3,214,234 | 10/1965 | Bottomley | 161/169 X |

FOREIGN PATENTS OR APPLICATIONS

| 61,878 | 10/1913 | Austria | 220/88 A |
|---|---|---|---|

OTHER PUBLICATIONS

Plastic Foam Fills Fuel Tanks to Suppress Explosion Hazard; from Product Engineering, Nov. 20, 1967, pages 127–128

Primary Examiner—Raphael H. Schwartz
Attorney—Young and Quigg

[57] ABSTRACT

A bulked or textured filamentary plastic material is employed in a fuel tank or other container as a means for reducing explosion hazard and/or as an anti-sloshing means.

10 Claims, 6 Drawing Figures

INVENTOR.
D.F. STEWART

SAFETY CONTAINER

This invention relates to a safety container.

The fuel in tanks on vehicles such as motor cars, racing cars, aircraft, and other fuel containers presents an explosion hazard due to the vapor space which forms above the fuel as the fuel is consumed. Said fuel tanks are also frequently subject to sudden changes in acceleration and deceleration forces, particularly in racing cars and aircraft. Said forces cause rapid surges of fuel from one part of the tank to another part thereof, e.g., a sloshing or movement back and forth. Said sloshing causes a shift in weight making the car difficult to steer. In an aircraft this sloshing or movement back and forth can result in fuel surging away from the engine supply outlet with serious consequences. The explosion hazards in tanks of racing cars and of military aircraft are well known.

The prior art has provided various solutions to the above problems. For example, see the following United States Pat. Nos.: Held 2,305,923; Frost, 2,850,083; and Conaway et al., 3,349,953. However, the solutions for said problems proposed by said patents, and all other prior art solutions of which I am aware, are either complex, difficult to install, and/or relatively expensive. It would be desirable to have a simple, easy to install, and inexpensive means for solving said problems. The present invention provides such a solution to said problems.

I have now discovered that a bulked or textured filamentary plastic material is an excellent filler material for reducing explosion hazards in fuel tanks and is also an excellent anti-sloshing means.

Accordingly, an object of this invention is to provide a tank or other container for fuel, or other liquid which forms explosive vapor, which provides a maximum safety against explosion hazards. Another object of the invention is to provide a means for reducing movement of fuel in fuel tanks which are subject to sudden changes in acceleration and deceleration forces. Another object of the invention is to provide an anti-sloshing means and explosion hazard reducing means which is inexpensive, lightweight, and easy to install. Other aspects, objects, and advantages of the invention will be apparent to those skilled in the art in view of this disclosure.

Thus, according to the invention, there is provided a liquid storage container structure having disposed therein an essentially self-supporting filler material formed of a bulked filamentary plastic material.

The term "filamentary," unless otherwise specified, is employed generically herein and in the claims to include both monofilament materials and multifilament materials. Thus, the term includes both monofilament and multifilament yarns. A bulked or textured filamentary material is one which has been treated to have a greater apparent bulk, e.g., it has been fluffed up so as to increase its volume. The bulking or texturizing treatment can be accomplished by any of the methods known in the art, e.g., twisting, looping, curling, gear crimping, stuffer box crimping, air jet, etc., or various combinations thereof. Preferably, the filamentary materials used in the practice of the invention are bulked or texturized to have an apparent density within the range of from 0.04 to 0.2, more preferably 0.05 to 0.1, gram per cc at room temperature, as defined in ASTM Designation E12–61T.

The filament in the filamentary material employed in the practice of the invention can be of any suitable size. For example, filament having a denier within the range of about 30 to 600, preferably 40 to 300, can be employed. The filament in said filamentary material is preferably continuous, i.e., of random but no particular length. However, it is within the scope of the invention to employ "staple" which has been cut to suitable lengths from a bulked monofilament or a bulked multifilament tow. Preferably, said "staple" will have a length of at least about 12 inches.

The filamentary material employed in the practice of the invention can be made from any suitable plastic material which is impervious or inert to the fuel or other liquid stored in the tank or container, and which can be bulked or texturized as described above. Examples of suitable plastic materials include polyolefins, nylon, dacron, polyester, acrylic, polyurethane, and others. The choice of the plastic material employed in any particular situation will depend upon the service of the tank or container and its contents. Thus, the invention is not limited to any particular plastic material. One presently preferred group of plastic materials are the polyolefins prepared by the methods disclosed and claimed by J. P. Hogan et al. in U.S. Pat. No. 2,825,721, issued Mar. 4, 1958. Polypropylene and polyethylene are presently preferred polyolefins.

Figure 1:
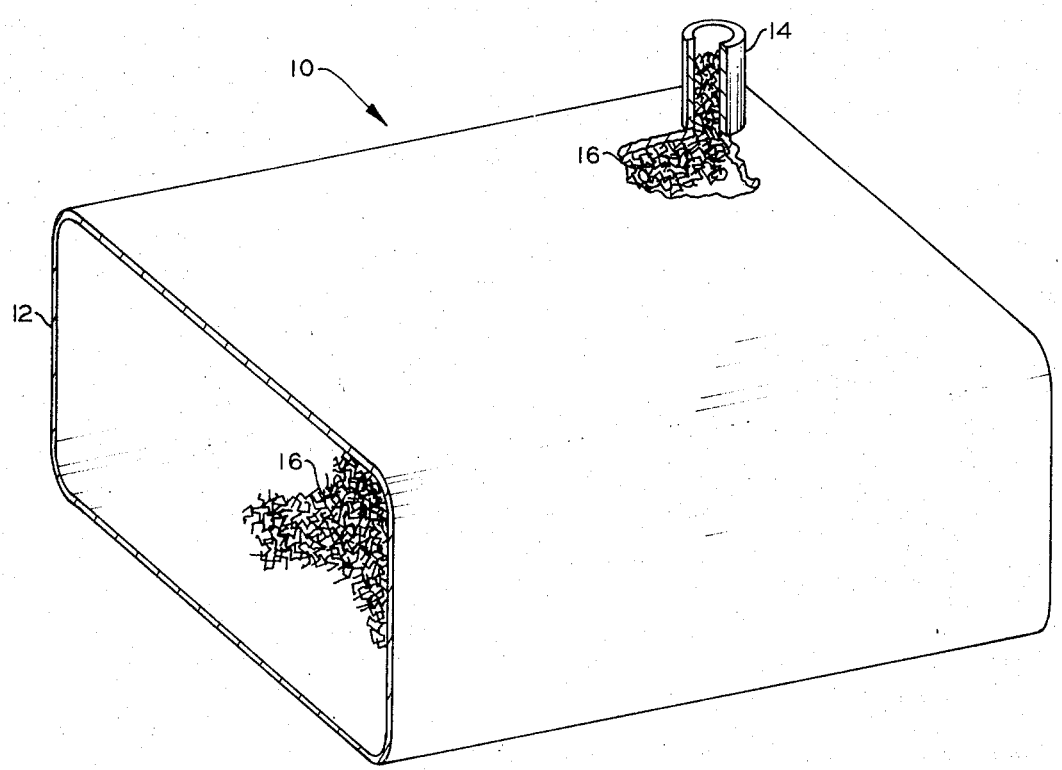
FIG. 1 is a diagrammatic illustration of a tank having disposed therein a bulked or textured filamentary material in accordance with the invention.
Figure 2:
FIG. 2 is a diagrammatic illustration of a monofilament which has been bulked (crimped) in a stuffer box crimper.
Figure 3:
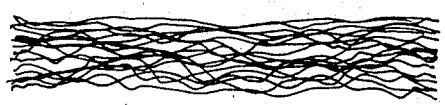
FIG. 3 is a diagrammatic reproduction of a photomicrograph of a multifilament yarn which has been bulked (crimped) in a stuffer box crimper.
Figure 4:
FIG. 4 is a diagrammatic illustration of a monofilament which has been bulked (crimped) in a gear crimper.
Figure 5:
FIG. 5 is a diagrammatic illustration of a multifilament yarn which has been bulked (crimped) in a gear crimper.
Figure 6:
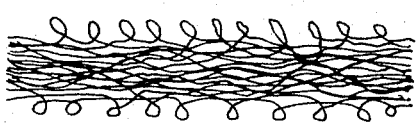
FIG. 6 is a diagrammatic illustration of a multifilament yarn which has been bulked by an air jet.

Referring now FIG. 1, the invention will be more fully explained. In said drawing there is illustrated a tank 10 which is formed of an enclosing wall 12. Said tank 10 can be of any suitable shape or configuration, and size, depending upon the service in which it is to be employed. Thus, while the tank 10 is here illustrated as being rectangular and of regular or symmetrical configuration, it is a feature of the invention that the tank 10 can have any shape or configuration. An inlet opening 14 is provided in the wall of said tank. While here illustrated as being straight and cylindrical, said inlet 14 can be curved or of any other suitable configuration, depending upon the service of the tank. An essentially self-supporting anti-sloshing and/or explosion hazard reducing means 16, formed of a bulked or textured filamentary plastic material, is disposed within said tank and is randomly arrayed therein in contact with the wall of the tank. Preferably, all of the interior of the tank will be occupied by said bulked or textured filamentary plastic material so as to obtain both of the advantages of reducing explosion hazard and preventing sloshing of the tank contents. The quantity of filling material in a completely filled tank will usually be such that from about 5 to about 10 per cent of the tank volume will be occupied by the filler material. In a sometimes still more preferred embodiment the bulked or textured filamentary plastic material is also placed in, or extends up into, the inlet opening 14 so as to provide additional protection against explosion hazards when the cap is removed from said inlet 14. However, when protection against explosion hazards is not necessarily important, it is within the scope of the invention to install only sufficient of said bulked or textured filamentary material so as to occupy approximately the lower one-third to three-fourths portion of the tank. This will provide a large measure of protection against movement of the fuel back and forth in the tank.

In addition to the above-mentioned advantages of reducing explosion hazards and preventing sloshing, a number of other advantages are realized or obtained in the practice of the invention. An outstanding advantage of the invention is that the bulked or textured filamentary plastic materials employed in the practice of the invention are essentially self-supporting. Thus, when said filamentary material is installed in the tank or container, no supporting means is necessary. The wall of the tank or container is the only other support for the bulked or textured filamentary material. The bulking or texturizing treatment given to said filamentary material prior to its installation renders it essentially self-supporting and no packing thereof occurs during use of the tank. Thus, no internal supporting framework is necessary in the tanks or containers of the invention. The bulked or texturized filamentary materials employed in the practice of the invention are inexpensive, costing only a few dollars per tank unit, the actual cost depending upon tank size. Thus, said filamentary materials can be widely employed, even in the most economical motor cars. For many of the relatively complex systems which have been employed in the prior art, the cost is prohibitive except in the more sophisticated vehicles, such as racing automobiles and military aircraft. The bulked or texturized filler materials of the invention are lightweight, having a density near that or only slightly greater than the density of the fuel in the tank. Thus, they do not significantly increase the weight of the vehicle. Said filamentary materials are also resilient and are not subject to breaking as are more rigid materials such as glass fibers.

A particularly important advantage of the bulked or textured filamentary plastic materials employed in the practice of the invention is the ease of installation in a tank or other container. Said filamentary materials can be readily placed in fully formed tanks or other containers of any shape or configuration manually or by pneumatic conveyance, even through goose-necked openings. This is a distinct advantage over the systems of the prior art wherein the filler materials must be installed while the tank is being manufactured. The filler materials of the invention are particularly well suited to be employed in plastic fuel tanks which are formed in a single molding operation, and in which the filler material can be installed after the tank has been manufactured. The filler materials of the invention can be readily installed in existing tanks on vehicles now in use. This cannot be done with systems of the prior art, e.g., preformed blocks of foamed materials.

The following example will serve to further illustrate the invention.

EXAMPLE

A 5-gallon polyethylene container was filled manually with a crimped tow of polypropylene. Said tow was formed of 60-denier monofilaments and the tow had a total denier of about 200,000. Said tow had been previously crimped in a stuffer box crimper by conventional methods so as to have approximately 12 to 15 crimps per inch therein, and an apparent density of 0.05 gram per cc. Said container was then filled with 4.7 gallons of gasoline showing that the previously installed filler material occupied 0.3 gallon or about 6 per cent of the tank volume. The filled tank was then placed on a delivery truck. After 46 days and 418 miles of stop-and-go driving, during which time the tank was emptied and refilled a total of seven times, the tank was removed from the delivery truck and inspected for any change in the extent of packing of the filamentary material therein. No change in the extent of packing could be noted.

The results of the above test run show that the bulked or textured filamentary plastic materials employed in the practice of the invention are essentially self-supporting and no internal framework or other supporting means is required in the interior of the tank to keep said filamentary material from packing during use.

While certain embodiments of the invention have been described for illustrative purposes, the invention is not limited thereto. Various other modifications of the invention will be apparent to those skilled in he art in view of this disclosure. Such modifications are within the spirit and scope of the disclosure.

I claim:

1. A liquid storage container structure, suitable for the storage of fuel, having disposed therein an essentially self-supporting filler material formed of a bulked filamentary plastic material.

2. A container structure according to claim 1 wherein said filler material is formed of a bulked filamentary polyolefin.

3. A container structure according to claim 2 wherein said filler material is formed of a bulked filamentary polyethylene.

4. A container structure according to claim 2 wherein said filler material is formed of a bulked filamentary polypropylene.

5. A container according to claim 4 wherein said bulked filamentary polypropylene has an apparent density within the range of from 0.04 to 0.2 gram per cc.

6. A fuel container structure according to claim 1, wherein:
the wall of said container is an enclosing wall;
an inlet opening is provided in said wall;
said filler material is randomly arrayed within said container in contact with said wall; and
said wall is the only other support for said essentially self-supporting filler material.

7. A container structure according to claim 6 wherein the lower one-third to three-fourths portion of the container is occupied by said filler material.

8. A container structure according to claim 6 wherein all the interior of said container is occupied by said bulked filamentary plastic material.

9. A container structure according to claim 8 wherein: said inlet opening comprises a conduit connected to said container; and said bulked filamentary material extends into said conduit.

10. A container structure according to claim 6 wherein: said bulked filler material has an apparent density within the range of from 0.04 to 0.2 gram per cc.; and the filaments in said bulked filamentary material have a denier within the range of about 30 to 600.

* * * * *